(12) United States Patent
Lyeo

(10) Patent No.: US 11,644,183 B2
(45) Date of Patent: May 9, 2023

(54) ELECTRONIC DEVICE INCLUDING LIGHT EMITTING APPARATUS

(71) Applicant: SAMSUNG ELECTRONICS CO., LTD., Suwon-si (KR)

(72) Inventor: Insuk Lyeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/828,963

(22) Filed: May 31, 2022

(65) Prior Publication Data

US 2022/0341569 A1    Oct. 27, 2022

Related U.S. Application Data

(63) Continuation of application No. PCT/KR2022/005873, filed on Apr. 25, 2022.

(30) Foreign Application Priority Data

Apr. 27, 2021    (KR) .................. 10-2021-0054446

(51) Int. Cl.
*F21V 17/18*    (2006.01)
*F21V 8/00*    (2006.01)

(52) U.S. Cl.
CPC ............ *F21V 17/18* (2013.01); *G02B 6/0006* (2013.01); *G02B 6/0008* (2013.01)

(58) Field of Classification Search
CPC ...... F21V 17/18; G02B 6/0006; G02B 6/0008

(Continued)

(56) References Cited

U.S. PATENT DOCUMENTS

| 2,068,652 A | * | 1/1937 | Brull | .................. | D01H 7/048 |
| | | | | | 384/603 |
| 4,929,866 A | * | 5/1990 | Murata | .............. | G02B 6/0036 |
| | | | | | 362/310 |

(Continued)

FOREIGN PATENT DOCUMENTS

| JP | 2001-184003 | 7/2001 |
| JP | 2004-006081 | 1/2004 |

(Continued)

OTHER PUBLICATIONS

Search Report and Written Opinion dated Jul. 26, 2022 issued in International Patent Application No. PCT/KR2022/005873.

*Primary Examiner* — Christopher M Raabe
(74) *Attorney, Agent, or Firm* — Nixon & Vanderhye, P.C.

(57) ABSTRACT

An electronic device according to various embodiments disclosed herein may include: a shield member comprising a light shield including a seating portion provided therein, a first opening provided in a front surface of the light shield and connected to the seating portion, and a second opening provided in a side surface of the light shield and connected to the seating portion, the electronic device may further include a light guide including a light-receiving portion and a guide portion extending in one direction from the light-receiving portion, wherein the guide portion is disposed in the second opening and the light-receiving portion is seated on the seating portion, and may include a light-emitting portion comprising light-emitting circuitry disposed in the first opening of the light shield to close the first opening and face the light-receiving portion.

20 Claims, 18 Drawing Sheets

(58) Field of Classification Search
USPC .................................................. 362/311.01
See application file for complete search history.

(56) References Cited

U.S. PATENT DOCUMENTS

| | | | |
|---|---|---|---|
| 5,050,179 A | 9/1991 | Mooradian | |
| 5,375,043 A * | 12/1994 | Tokunaga | G02B 6/0021 |
| | | | 362/555 |
| 6,002,079 A * | 12/1999 | Shin | F21V 33/0056 |
| | | | 84/600 |
| 2004/0233127 A1 * | 11/2004 | Niitsu | G02B 6/0033 |
| | | | 345/60 |
| 2008/0225417 A1 * | 9/2008 | Kuhn | B60Q 1/2665 |
| | | | 359/839 |
| 2008/0291685 A1 * | 11/2008 | Misawa | F21S 43/237 |
| | | | 362/459 |
| 2015/0003112 A1 * | 1/2015 | McCollum | G02B 6/0021 |
| | | | 362/613 |
| 2016/0026065 A1 | 1/2016 | Baek et al. | |
| 2021/0146830 A1 * | 5/2021 | Suzuki | B60Q 3/54 |

FOREIGN PATENT DOCUMENTS

| | | |
|---|---|---|
| JP | 2007-079435 | 3/2007 |
| KR | 20-1999-0008334 | 3/1999 |
| WO | 93/05553 | 3/1993 |

* cited by examiner

ELECTRONIC DEVICE INCLUDING LIGHT EMITTING APPARATUS

CROSS-REFERENCE TO RELATED APPLICATIONS

This application is a continuation of International Application No. PCT/KR2022/005873 designating the United States, filed on Apr. 25, 2022, in the Korean Intellectual Property Receiving Office and claiming priority to Korean Patent Application No. 10-2021-0054446, filed on Apr. 27, 2021, in the Korean Intellectual Property Office, the disclosures of which are incorporated by reference herein in their entireties.

BACKGROUND

Field

The disclosure relates to an electronic device including a light-emitting apparatus.

Description of Related Art

A light-emitting diode device for displaying a state of an electronic device may be disposed inside an electronic device such as a notebook computer or a personal computer. A user may know the state of the electronic device through the light from the light-emitting diode emitted to the outside of the electronic device. For example, the user may know that the state of the electronic device changes based on a color change of light emitted to the outside of the electronic device from the light-emitting diode.

A light blocking member may be disposed around the light-emitting diode to guide the light generated from the light-emitting diode in a desired direction and to prevent or reduce the light from traveling in an unnecessary direction.

A lens may be disposed at a position adjacent to the light-emitting diode disposed inside an electronic device. The light generated from the light-emitting diode may be refracted in a desired direction through the lens. When the lens is used, a phenomenon in which light refracted through the lens travels in an unnecessary direction may occur. In order to address this problem, a light blocking material or the like may be disposed around the lens. As the light blocking material is separately disposed around the lens, the production cost of the electronic device may increase.

SUMMARY

Embodiments of the disclosure provide an electronic device that may include a light blocking structure capable of reducing the production cost of the electronic device while preventing and/or reducing a phenomenon in which light refracted through a lens travels in an unnecessary direction.

An electronic device according to various example embodiments disclosed herein may include: a shield member comprising a light shielding material including a seating portion provided therein, a first opening provided in a front surface of the shield member to be connected to the seating portion, and a second opening provided in a side surface of the shield member to be connected to the seating portion, may include a light guide including a light-receiving portion and a guide portion extending in one direction from the light-receiving portion, wherein the guide portion is disposed in the second opening and the light-receiving portion is seated on the seating portion, and may include a light-emitting portion inserted into the first opening of the shield member to close the first opening and face the light-receiving portion.

An electronic device according to various example embodiments disclosed herein may include: a housing, a hole provided in the housing in a first direction, a light guide, a shield member comprising a light shielding material including a seating portion configured such that the light guide is seated in the seating portion, a first opening provided in the front surface of the shield member to be connected to the seating portion, a second opening provided in the second surface of the shield member to be connected to the seating portion, and a third opening provided in the rear surface of the shield member opposite to the front surface in a second direction perpendicular to the first direction to be connected to the seating portion, where the third opening is closed by the housing, and a light-emitting portion comprising light-emitting circuitry is inserted into the first opening of the shield member to face the light guide and to close the first opening, wherein, in the shield member, the second opening may be connected to the hole such that light generated from the light-emitting portion can be emitted to the outside of the electronic device.

According to various example embodiments disclosed herein, it is possible to make light generated from a light-emitting diode disposed in an electronic device travel in a desired direction through a shield member that may be used in combination with a lens.

In addition, as the lens is shielded from light by the shield member, a separate light-blocking material may not be required. Accordingly, the production cost of the electronic device can be reduced.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
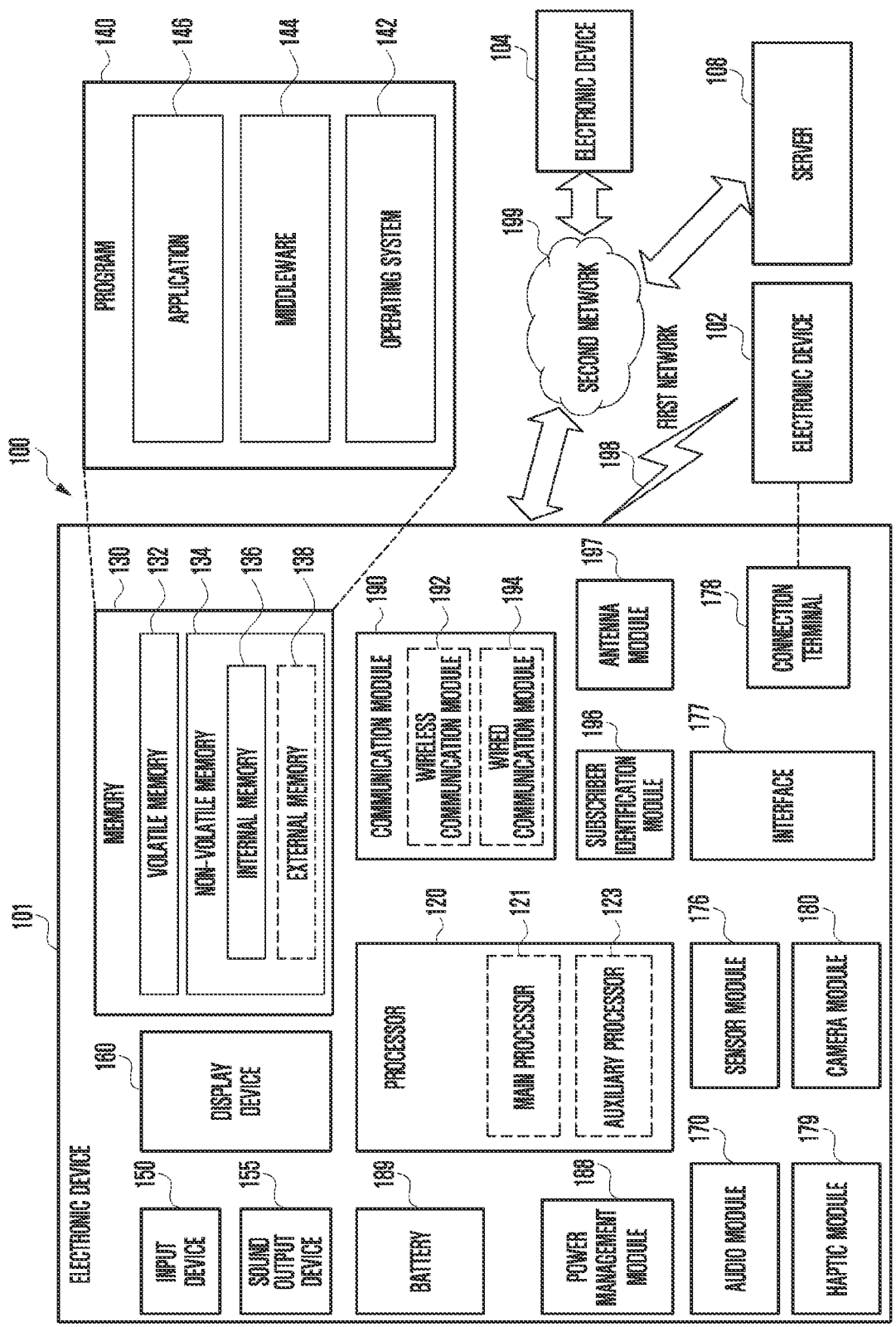
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following description, the same reference numerals are used for the same or similar components, except for a case in which where reference numerals are separately indicated. Descriptions for the same reference numerals may be omitted.

Figure 2:
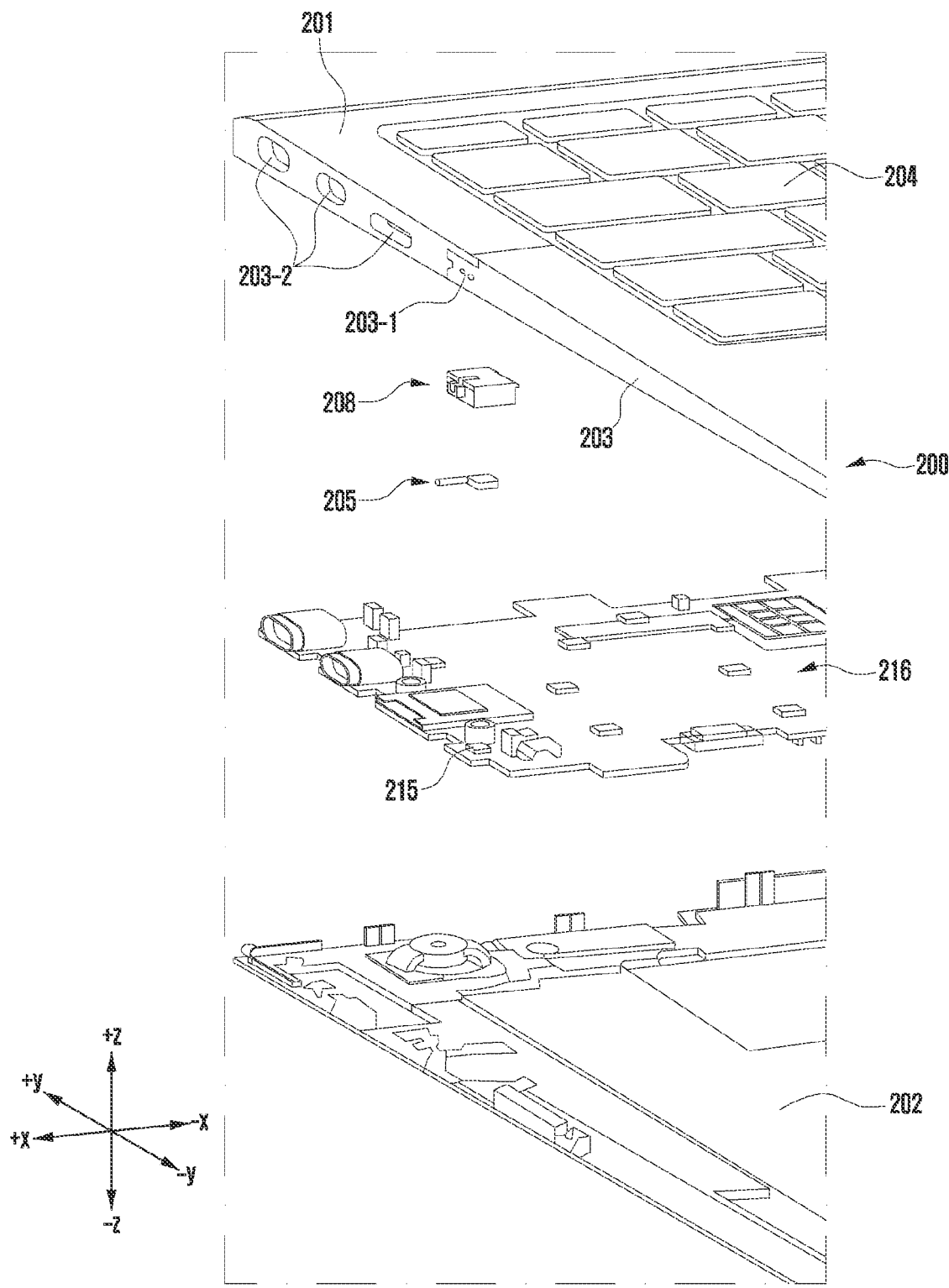
FIG. 2 is a partial exploded perspective view illustrating components of an electronic device according to various embodiments.

FIG. 2 is a partial exploded perspective view illustrating components of an electronic device according to various embodiments.

According to various embodiments, as illustrated in FIG. 2, the appearance of the electronic device 200 (e.g., the electronic device 101 of FIG. 1) may be defined by a front cover 201, a rear cover 202, and a side member (e.g., side wall) 203 surrounding the space between the front cover 201 and the rear cover 202. Inside the electronic device 200, a printed circuit board 216 to which electronic components are electrically connected, a light-emitting portion (e.g., including light emitting circuitry) 215, a light guide member (e.g., a light guide) 205 disposed around the light-emitting portion 215, and a shield member (e.g., a light shield) 208 surrounding the light guide member 205 may be included. In addition to these components, various electronic components may be disposed in the electronic device 200. In various embodiments, at least one of the above-described components may be omitted or at least one other component may be additionally included in the electronic device 200.

According to various embodiments, the appearance of the electronic device 200 may be defined by the front cover 201, the rear cover 202, and the side member 203 connecting the front cover 201 and the rear cover 202 to each other. The side member 203 may be integrated with the front cover 201 or the rear cover 202. According to an embodiment, the side member 203 may be integrated with the front cover 201.

According to various embodiments, various connector ports 203-2 may be provided in the side member 203. The connector ports 203-2 may include a connector (e.g., a USB connector or an interface connector port module (IF module)) for transmitting/receiving power and/or data to and from an external electronic device 200. In various embodiments, the connector ports 203-2 may perform a function for transmitting/receiving an audio signal to and from the external electronic device 200 together, or may further include a separate connector port 203-2 (e.g., an ear jack hole) for performing a function of transmitting/receiving an audio signal.

According to various embodiments, the front cover 201, the rear cover 202, and the side member 203 may be formed of various materials. For example, the front cover 201, the rear cover 202, and the side member 203 may be formed of a metal material and/or a non-metal material. The metal material may include an alloy of aluminum, stainless steel (STS, SUS), iron, magnesium, titanium, or the like, and the non-metal material may include a synthetic resin, ceramic, or engineering plastic. In addition, the front cover 201, the rear cover 202, and the side member 203 may be manufactured in various ways. For example, the front cover 201, the rear cover 202, and the side member 203 may be formed by a method such as injection molding or die casting.

According to various embodiments, in the front cover 201, the rear cover 202, and the side member 203, various portions segmented from each other may be connected in various ways (e.g., bonding using an adhesives, bonding through welding, bonding using a bolt). The shapes, materials, and forming methods of the front cover 201, the rear cover 202, and the side member 203 described above with reference to FIG. 2 are merely examples, and can be variously changed within a range that can be implemented by a person ordinarily skilled in the art.

According to various embodiments, physical keyboards 204 may be disposed on the front cover 201. The physical keyboards 204 may be various types of keyboards having a switch capable of recognizing a physical force applied by a user. For example, the physical keyboards 204 may be membrane-type keyboards each including a membrane-switch or pantograph-type keyboards each including a scissor-switch. In addition, the physical keyboards 204 according to various embodiments disclosed herein may be various types of keyboards capable of receiving a physical force input.

According to various embodiments, the light-emitting portion 215 may be electrically connected to the printed circuit board 216 to generate light. In various embodiments, the light-emitting portion 215 may include a printed circuit board 216. The light-emitting portion 215 may include an element capable of emitting light, such as a light-emitting diode (LED) or an organic light-emitting diode (OLED). In addition, the light-emitting portion 215 may include various elements capable of emitting light.

In addition, a description of the light guide member 205 and the shield member 208 disposed in the electronic device 200 and a detailed description of a method of blocking the light of the light-emitting portion 215 by a combination of the light guide member 205 and the shield member 208 will be provided later.

Figure 3A:
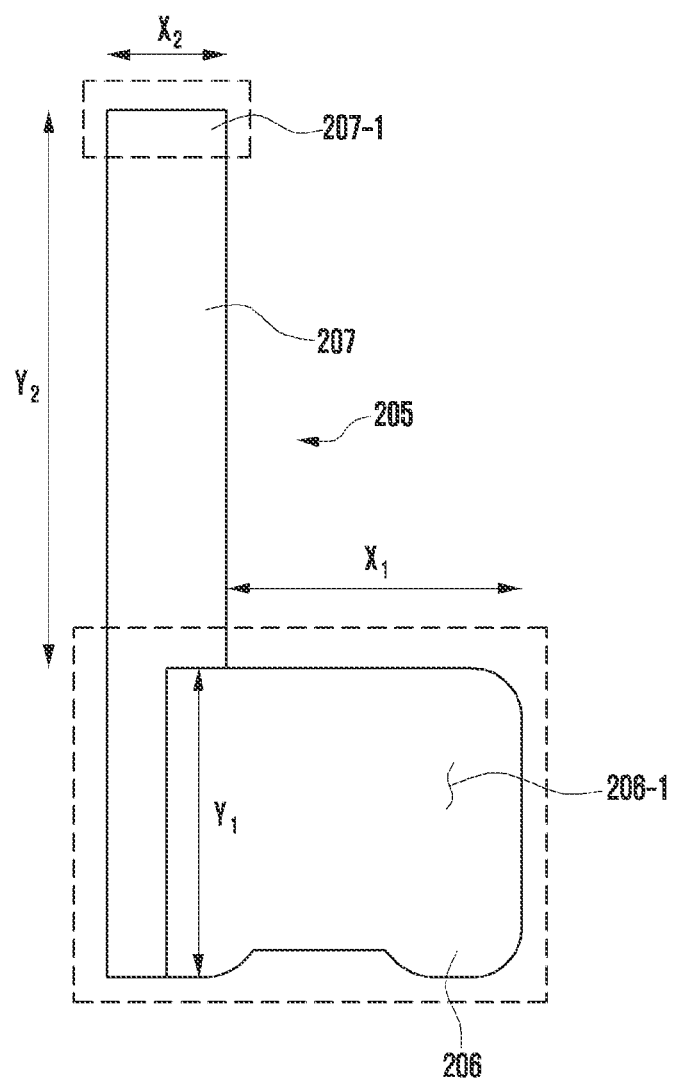
FIGS. 3A and 3B are diagrams illustrating an example configuration of a light guide member according to various embodiments.
Figure 3B:
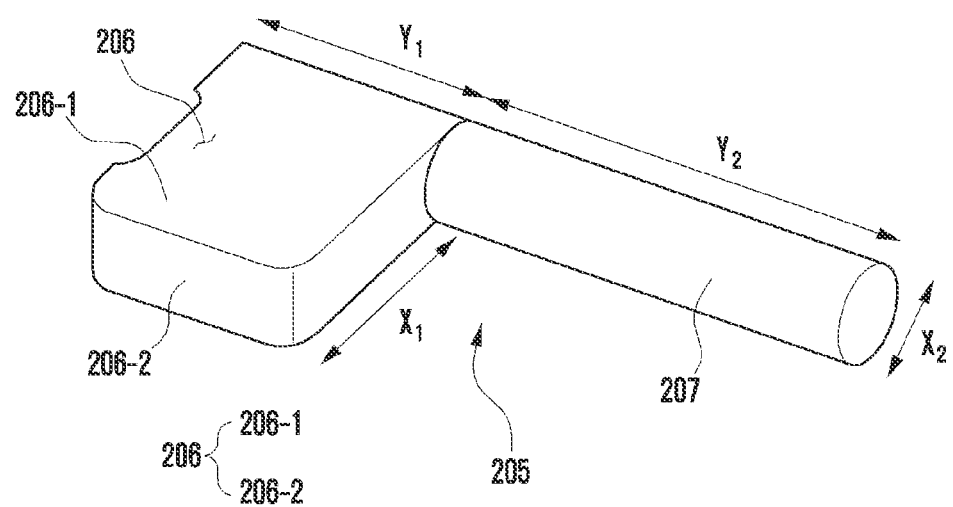

FIGS. 3A and 3B are a diagram and perspective view, respectively illustrating a light guide member according to various embodiments.

According to various embodiments, the light guide member (which may be referred to herein as a "light guide") 205 may be disposed around the light-emitting portion 215 disposed in the electronic device 200 (e.g., the electronic device 101 in FIG. 1). The light guide member 205 may be disposed adjacent to the light-emitting portion 215. The light guide member 205 may change the traveling direction of the light generated by the light-emitting portion 215. For example, the traveling direction of light generated from the light-emitting portion 215 may be changed using a refraction or reflection phenomenon occurring in the light guide member 205.

According to various embodiments, the light guide member 205 may include a light-receiving portion 206 and a guide portion 207. The light-receiving portion 206 may refer to a portion in which the light generated by the light-emitting portion 215 is received by the light guide member 205. The guide portion 207 may refer to a portion that guides the light incident on the light-receiving portion 206 to the outside of the electronic device 200. As illustrated, for example, in FIGS. 4A, 4B and 4D, the light-receiving portion 206 may be disposed on the seating portion 209 of the shield member 208, and the guide portion 207 may be disposed in the second opening 211.

According to various embodiments, the light-receiving portion 206 and the guide portion 207 may have different areas. According to an embodiment, as illustrated in FIG. 3, the guide portion 207 may be disposed to extend in one direction from the light-receiving portion 206. The widthwise length X1 of the light-receiving portion 206 may be longer than the widthwise length X2 of the guide portion 207. The light-receiving portion 206 may have a length Y1 in the extension direction thereof shorter than a length Y2 of the guide portion 207 in the extension direction of the same. In addition to this, the shapes of the light-receiving portion 206 and the guide portion 207 may be variously changed within a range that can be implemented by a person ordinarily skilled in the art, and the disclosure is not limited to the shapes of the light-receiving portion 206 and the guide portion 207 described above.

According to various embodiments, the light guide member 205 may be formed of various materials. For example, the light guide member 205 may be formed of glass, a transparent synthetic resin, or the like. In addition, the light guide member 205 may be manufactured in various ways. For example, the light guide member 205 may be manufactured using a method such as insert injection molding, double injection molding, or the like. The light guide member 205 may be manufactured in a single body including a transparent portion and an opaque portion using a method such as insert injection molding, double injection molding, or the like.

In addition, the light-receiving portion 206 and the guide portion 207 are merely conceptually separated for describing the light guide member 205, and may not be physically separated on the light guide member 205. In the light guide member 205, the light-receiving portion 206 and the guide portion 207 may be formed as a single body using insert injection molding or double injection.

The shape and material of the light guide member 205 illustrated in FIG. 3 described above are merely examples, and the light guide member 205 may be variously changed within a range that can be implemented by a person ordinarily skilled in the art.

Figure 4A:
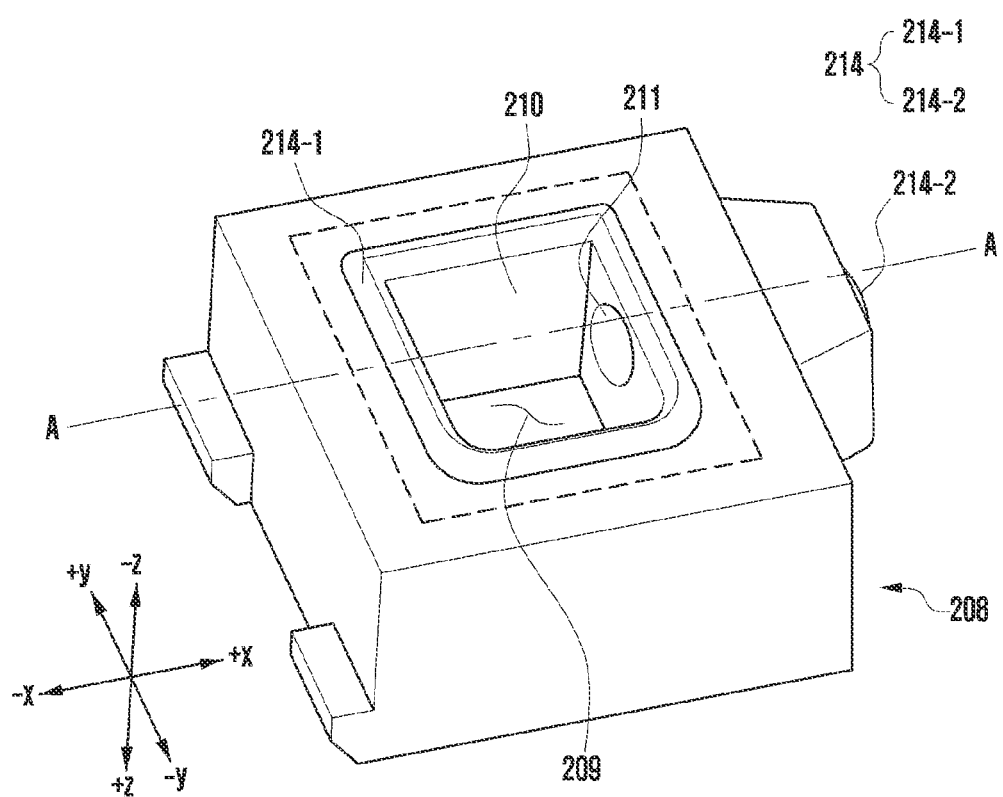
FIG. 4A is a front perspective view of a shield member according to various embodiments.
Figure 4B:
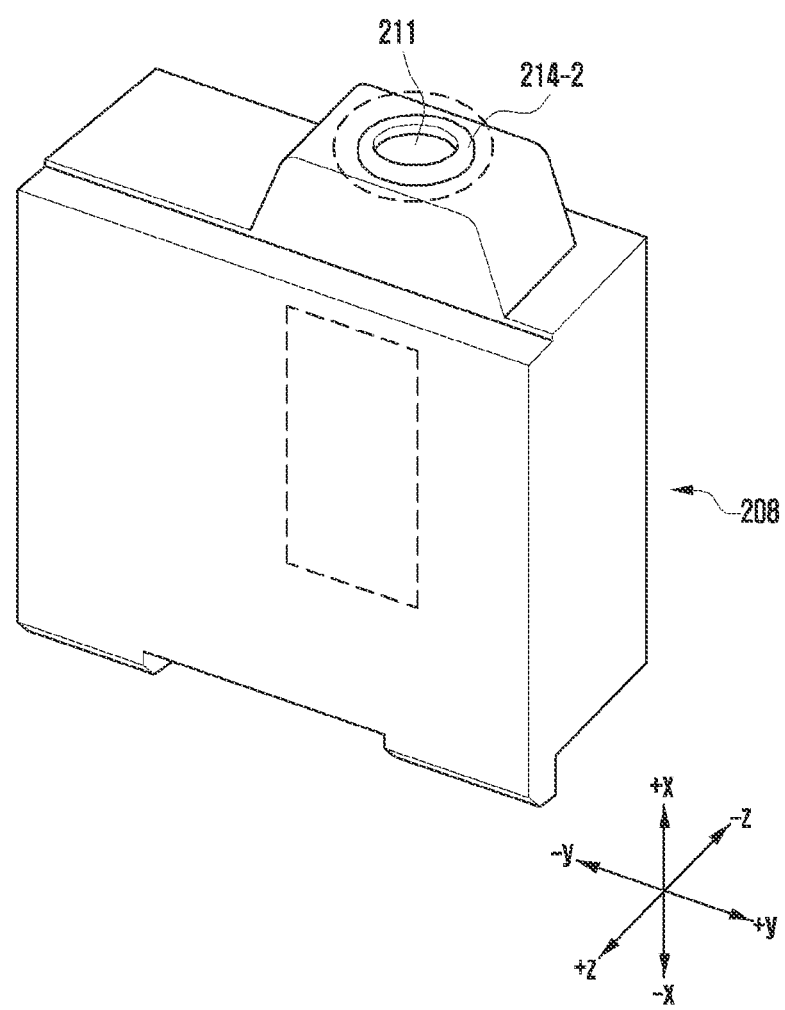
FIG. 4B is a rear perspective view of the shield member according to various embodiments.
Figure 4C:
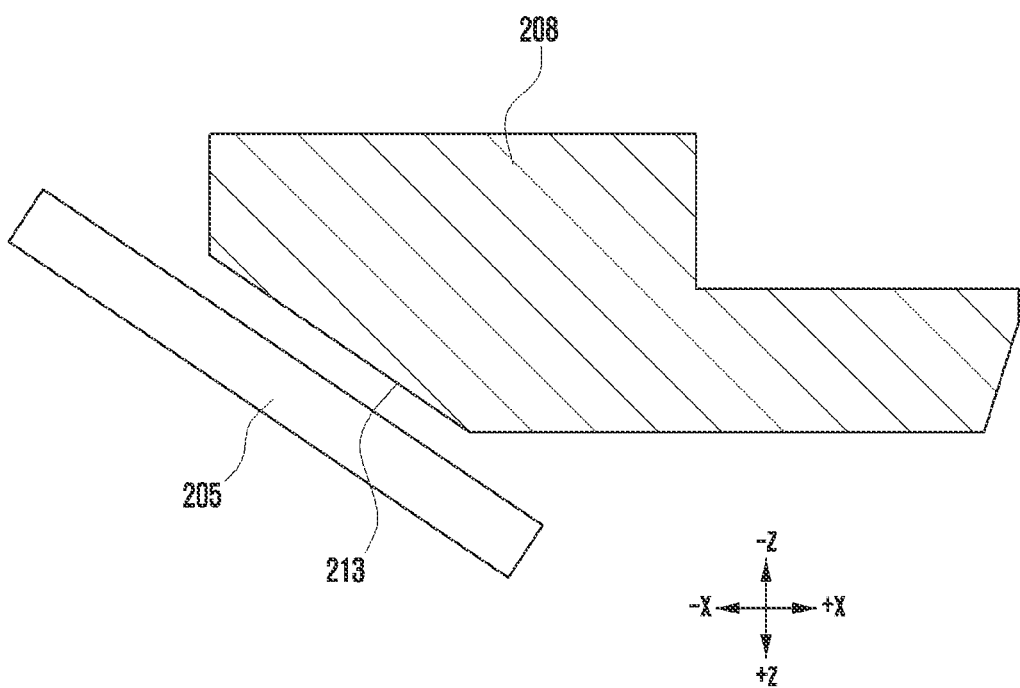
FIG. 4C is a partially enlarged view of an inclined surface provided on the shield member according to various embodiments.
Figure 4D:
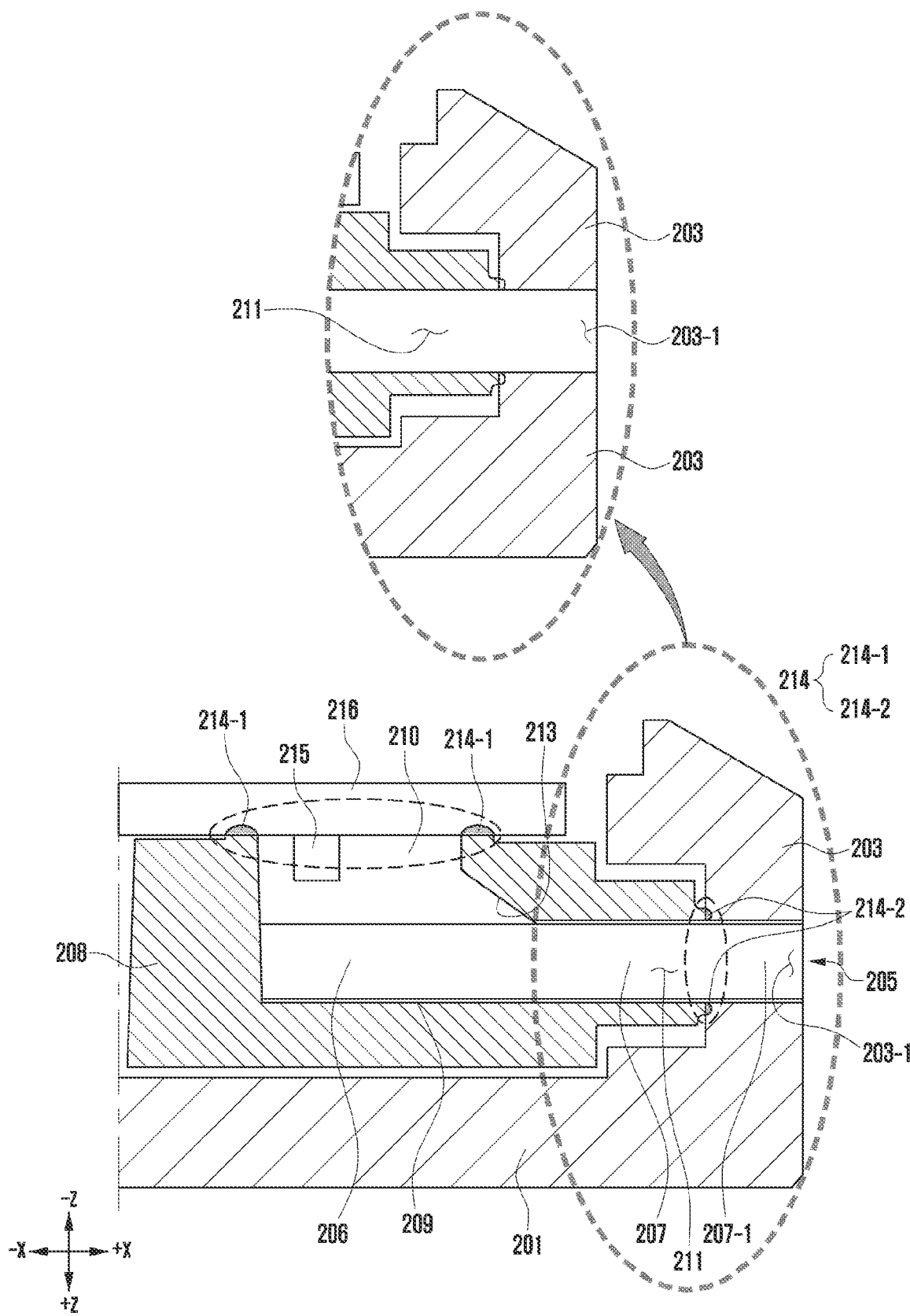
FIG. 4D is a cross-sectional view of the shield member, taken along line A-A of FIG. 3A according to various embodiments.

FIG. 4A is a front perspective view of a shield member according to various embodiments. FIG. 4B is a rear perspective view of the shield member according to various embodiments. FIG. 4C is a partially enlarged view of an inclined surface provided on the shield member according to various embodiments. FIG. 4D is a cross-sectional view of the shield member taken along line A-A of FIG. 4A according to various embodiments.

According to various embodiments, a shield member (e.g., a light shield) 208 may be disposed inside the electronic device 200 (e.g., the electronic device 101 of FIG. 1). The light guide member (e.g., light guide) 205 may be inserted into and assembled to the shield member 208. The periphery of the light guide member 205 may be shielded by the shield member 208.

According to various embodiments, as illustrated in FIGS. 4A and 4B, a space may be provided in the shield member 208 to allow the light guide member 205 to be inserted therein. According to an embodiment, a seating portion 209 may be provided inside the shield member 208. A first opening 210 connected to the seating portion 209 may be provided in the front surface of the shield member 208. A second opening 211 connected to the seating portion 209 may be provided in a side surface surrounding the space between the front surface of the shield member 208 and the rear surface opposite to the front surface. The first opening 210 and the second opening 211 provided in the shield member 208 may be connected to each other via the seating portion 209.

According to various embodiments, the light-emitting portion 215 may be inserted into the first opening 210 provided in the shield member 208. The first opening 210 may be closed by the printed circuit board 216 electrically connected to the light-emitting portion 215.

According to various embodiments, the first opening 210 provided in the shield member 208 may serve as a passage that allows the light guide member 205 to be inserted into the shield member 208. The first opening 210 may have a size that allows the light guide member 205 to be inserted into the shield member 208. For example, the first opening 210 may be larger than or at least equal to a first surface 206-1 of the light-receiving portion 206 of the light guide member 205 of FIG. 3. In addition, the first opening 210 may have a size sufficient to allow the light guide member 205 to be inserted into the shield member 208.

According to various embodiments, when the light guide member 205 is inserted into the shield member 208 through the first opening 210, the guide portion 207 of the light guide member 205 may be disposed in the second opening 211 provided in the shield member 208. The light-receiving portion 206 of the light guide member 205 may be disposed in the seating portion 209 provided inside the shield member 208. According to an embodiment, the first surface 206-1 of the light-receiving portion 206 may be seated in the seating portion 209.

According to various embodiments, the seating portion 209 and the second opening 211 provided in the shield member 208 may have sizes that allow the light guide member 205 to be inserted into and fixed to the shield member 208. The size of the second opening 211 of the shield member 208 may correspond to the size of the guide portion 207 of the light guide member 205. For example, the second opening 211 may be larger than or at least equal to the volume of the guide portion 207. The seating portion 209 of the shield member 208 may be provided to correspond to the light-receiving portion 206 of the light guide member 205. For example, the seating portion 209 may be larger than or at least equal to the first surface 206-1 of the light-receiving portion 206. The seating portion 209 connected to the first opening 210 may have a size corresponding to the size of the first opening 210. The seating portion 209 and the second opening 211 may have a size that allows the light guide member 205 to be inserted into and fixed to the shield member 208.

According to various embodiments, an inclined surface 213 may be provided on the shield member 208. The inclined surface 213 may be provided on the inner surface of the shield member 208 between the first opening 210 and the seating portion 209. In the process of installing the light guide member 205 to the shield member 208, the light guide member 205 may be inserted in the state of being inclined relative to the shield member 208. The light guide member 205 may be easily inserted thanks to the inclined surface 213 provided on the inner surface of the shield member 208.

According to various embodiments, the shield member 208 may be disposed adjacent to the side member 203 of the electronic device 200. The second opening 211 of the shield member 208 may be connected to a hole 203-1 provided in the side member 203 of the electronic device 200. In an embodiment, as illustrated in FIG. 4D, a distal end 207-1 of the guide portion 207 protruding from the second opening 211 may be exposed to the outside of the electronic device 200. For example, the distal end 207-1 of the guide portion 207 may be disposed in the hole 203-1 of the side member 203 to be exposed to the outside of the electronic device 200. In an embodiment, the distal end 207-1 of the guide portion 207 may not be directly disposed in the hole 203-1 of the side member 203. For example, the distal end 207-1 of the guide portion 207 may be disposed in the second opening 211 connected to the hole 203-1 of the side member 203 so that the light generated from the light-emitting portion 215 can be transmitted from the second opening 211 toward the hole 203-1.

According to various embodiments, the shield member 208 may be formed of various materials. For example, the shield member 208 may be formed of at least one of rubber, urethane, and silicone. The first opening 210, the second opening 211, and the seating portion 209 of the shield member 208 may be manufactured in various shapes depending on the shape of the light guide member 205. Furthermore, the material and shape of the shield member 208 may be variously changed within a range that can be implemented by a person ordinarily skilled in the art.

According to various embodiments, as illustrated in FIG. 4D, the light-emitting portion 215 may be inserted into the first opening 210 and disposed to face the light-receiving portion 206 disposed in the seating portion 209. The printed circuit board 216 electrically connected to the light-emitting portion 215 may be disposed to cover the first opening 210. The first opening 210 may be closed by the printed circuit board 216. Accordingly, the light generated from the light-emitting portion 215 may travel to the light-receiving portion 206 without escaping through the first opening 210.

Referring to FIG. 4D, the light generated from the light-emitting portion 215 may be incident on the light-receiving portion 206 facing the light-emitting portion 215 using air as a medium. As some of the light incident from the light-emitting portion 215 on the light-receiving portion 206 is reflected from the surface of the light-receiving portion 206 and some other light passes through the interface of different media, the direction of travel may be changed due to the difference in refractive index and refraction may occur. Light refracted from the light-emitting portion 215 to the light-receiving portion 206 may be repeatedly reflected within the guide portion 207 and may move along the extension direction of the guide portion 207 (e.g., the +X direction in FIG. 4D). Finally, after moving along the extension direction of the guide portion 207, the light generated from the light-emitting portion 215 may be emitted to the outside of the electronic device 200 through the hole 203-1 of the side member 203 connected to the distal end 207-1 of the guide portion 207.

In various embodiments disclosed herein, the light guide member 205 may be inserted into the shield member 208. The first opening 210 provided in the shield member 208 may be closed by the printed circuit board 216. As the first opening 210 is closed, the light guide member 205 may be shielded, except for the distal end 207-1 of the guide portion 207 connected to the hole 203-1 of the side member 203. Due to the coupling of the shield member 208 and the light guide member 205, the light generated from the light-emitting portion 215 may not travel in an unnecessary direction. The light generated from the light-emitting portion 215 travels along the extension direction of the guide portion 207 and may be emitted to the outside of the electronic device 200 only through the hole 203-1 of the side member 203 connected to the distal end 207-1 of the guide portion 207.

Conventionally, in order to prevent and/or reduce the light emitted from the light-emitting portion 215 from traveling in an unnecessary direction, the light guide member 205 was individually painted or a separate light blocking member was attached to the light guide member 205. This made it possible to make the light from the light-emitting portion 215 only travel to the outside of the electronic device 200. However, this light blocking method has several disadvantages. For example, since each necessary portion of the light guide member 205 is individually painted or provided with a light blocking member, the material cost increases. In addition, since each necessary portion of the light guide member 205 is individually painted or provided with a light blocking member, the efficiency in the manufacturing process is poor.

In the disclosure, by the structure in which the light guide member 205 is inserted into the shield member 208, the shield member 208 may effectively shield the periphery of the light guide member 205 to prevent and/or reduce the light generated from the light-emitting portion 215 from traveling in an unnecessary direction. Accordingly, since the periphery of the light guide member 205 can be shielded by a single shield member 208, the material cost of the electronic device 200 can be reduced compared to the related art. In addition, the efficiency of the manufacturing process may be increased compared to individually painting the light guide member 205 or providing light blocking members to the light guide member 205.

According to various embodiments, a protrusion structure 214 may be provided on the shield member 208. The protrusion structure 214 may be provided around the first opening 210 and the second opening 211. For example, the protrusion structure 214 may be provided to surround the first opening 210 and the second opening 211.

According to various embodiments, a first protrusion structure 214-1 may be provided on the shield member 208 to surround the first opening 210. The first protrusion structure 214-1 may face the printed circuit board 216 that closes the first opening 210. For example, a portion of the first protrusion structure 214-1 facing the printed circuit board 216 may protrude toward the printed circuit board 216. The first protrusion structure 214-1 may be compressed by the printed circuit board 216. The first protrusion structure 214-1 may be electrically connected to the printed circuit board 216 to prevent and/or reduce the light generated from the light-emitting portion 215 inserted into the first opening 210 from being emitted through the space between the printed circuit board 216 and the shield member 208.

According to various embodiments, a second protrusion structure 214-2 may be provided on the shield member 208 to surround the second opening 211. The second protrusion structure 214-2 may face the side wall member 203 connected to the distal end 207-1 of the guide portion 207. For example, in the second protrusion structure 214-2, a portion facing the side wall member 203 may protrude toward the side wall member 203. The second protrusion structure 214-2 may be compressed by the side wall member 203. The second protrusion structure 214-2 may prevent and/or reduce a liquid, foreign material, or the like that has been introduced through the hole 203-1 provided in the side member, from entering the electronic device 200.

Figure 5A:
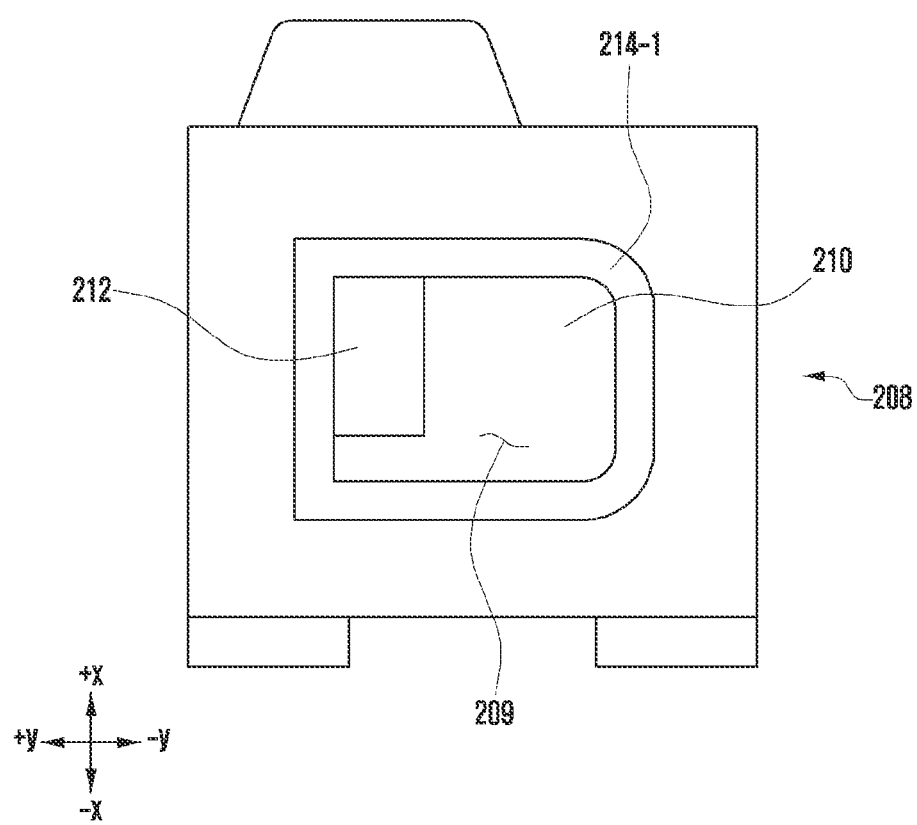
FIG. 5A is a front view of a shield member according to various embodiments.
Figure 5B:
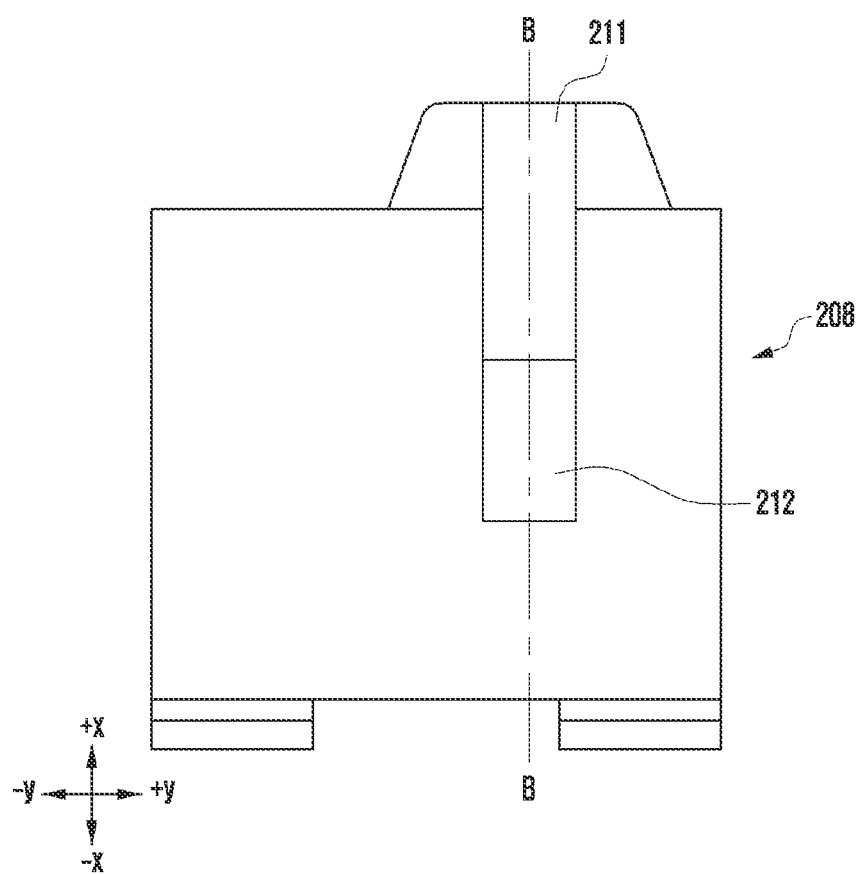
FIG. 5B is a rear view of the shield member according to various embodiments.
Figure 5C:
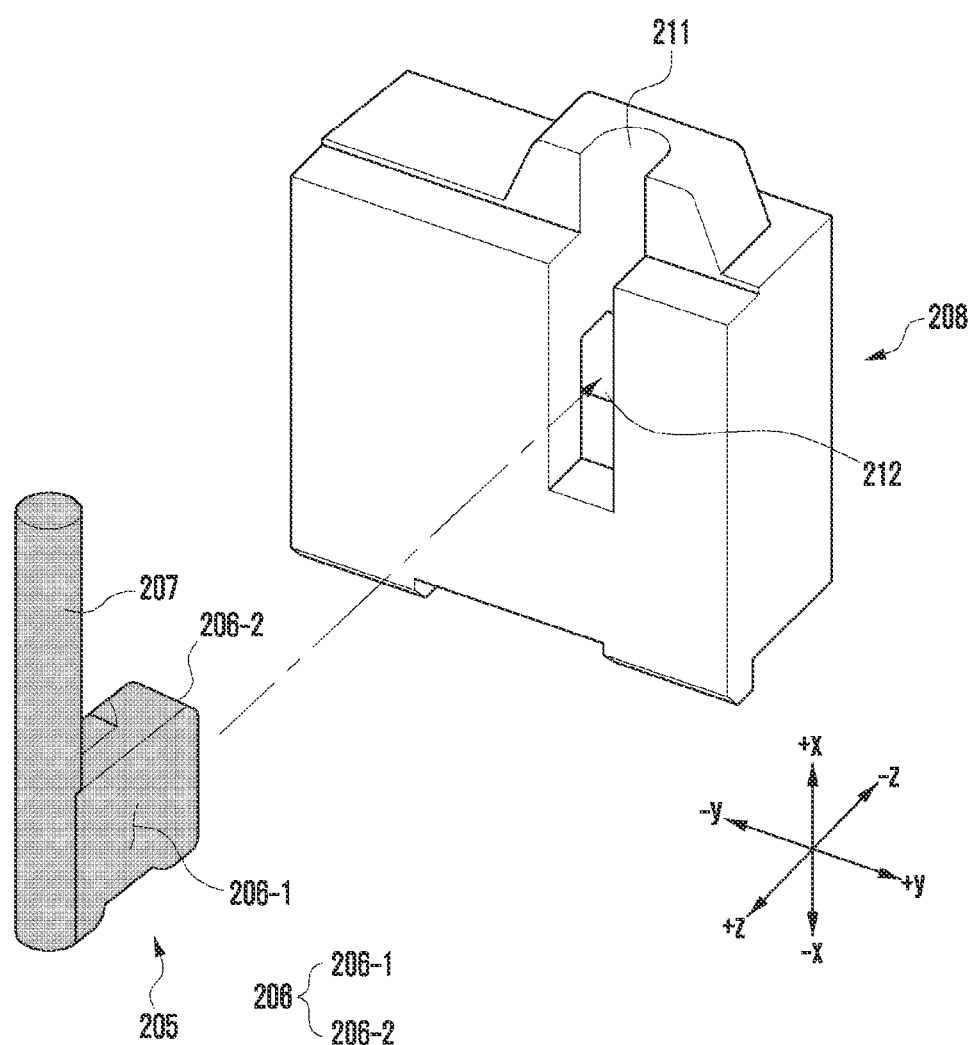
FIGS. 5C, 5D and 5E are perspective views illustrating an example process of inserting a light guide member into a shield member according to various embodiments.
Figure 5D:
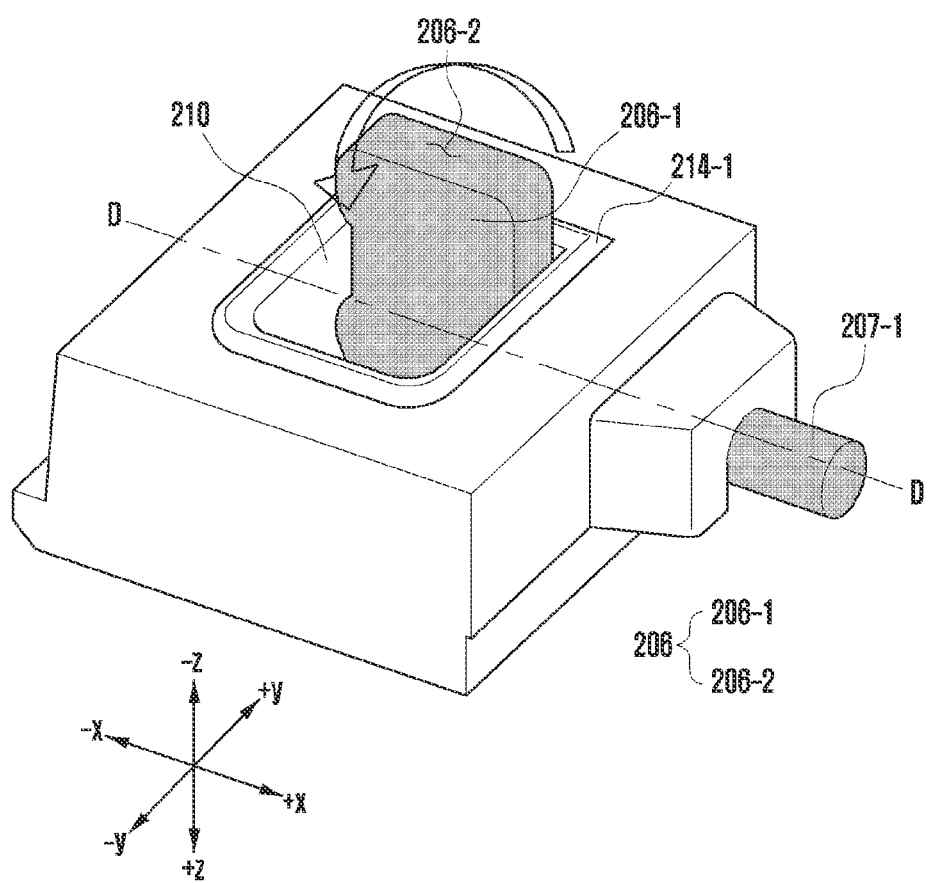
Figure 5E:
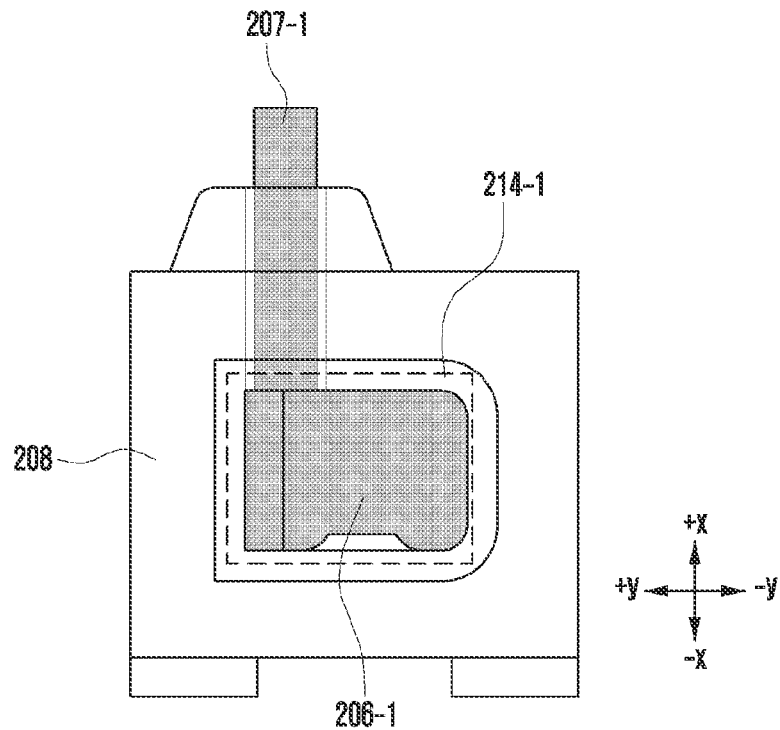
Figure 5E:
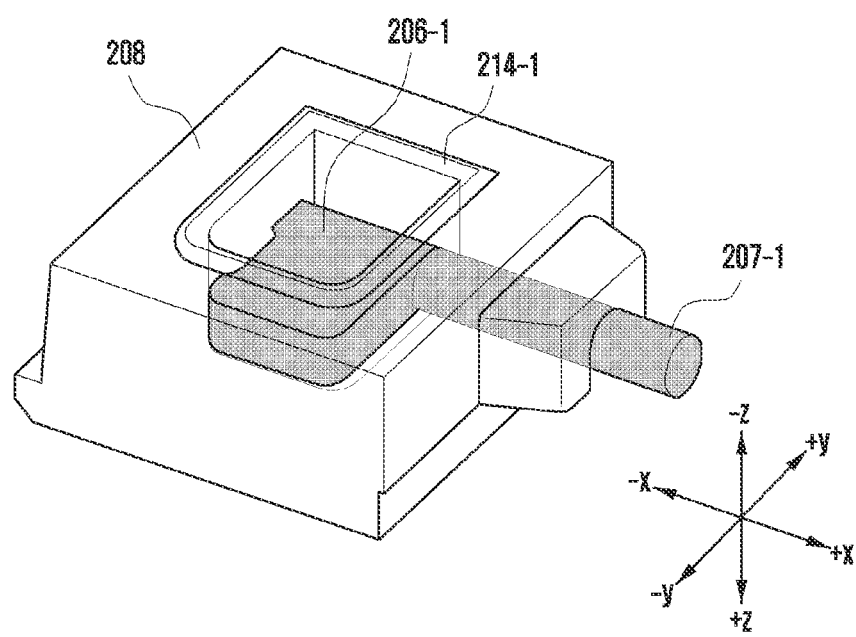
Figure 5F:
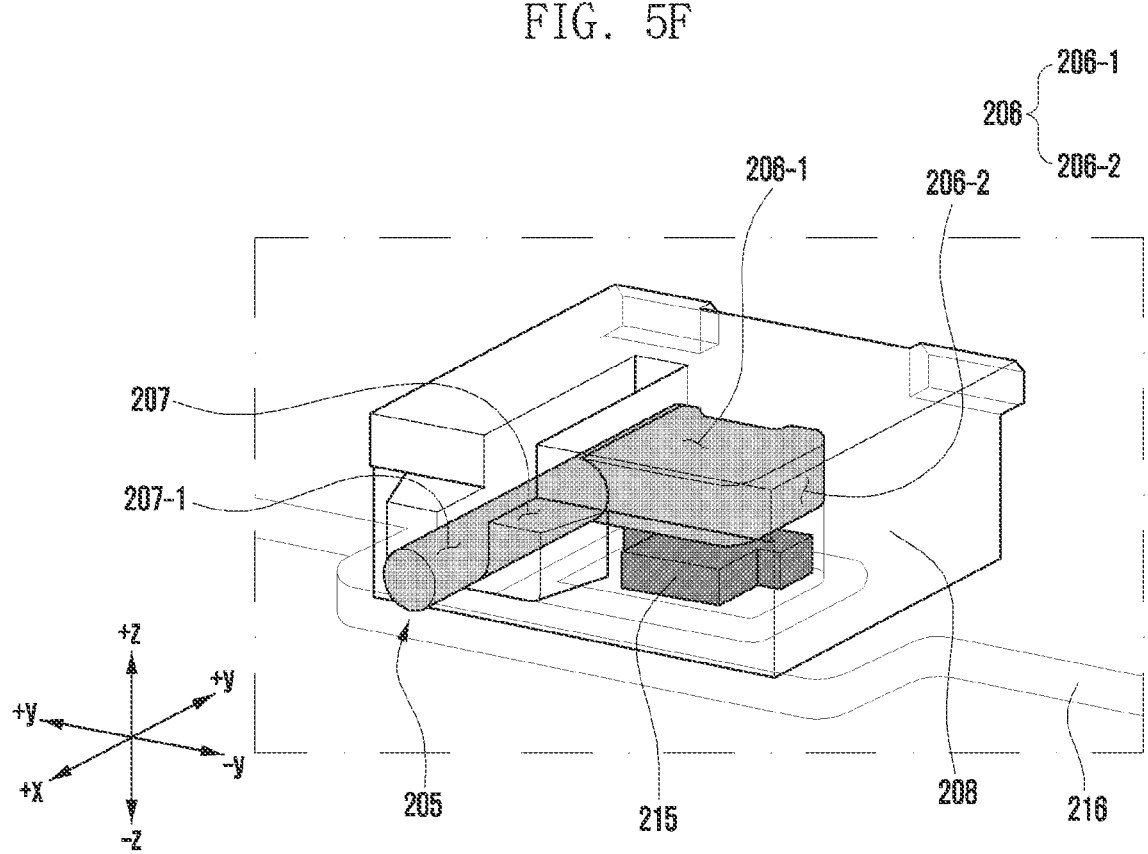
FIG. 5F is a view illustrating a state in which a shield member, a light guide member, and a light-emitting portion are assembled according to various embodiments.
Figure 5F:
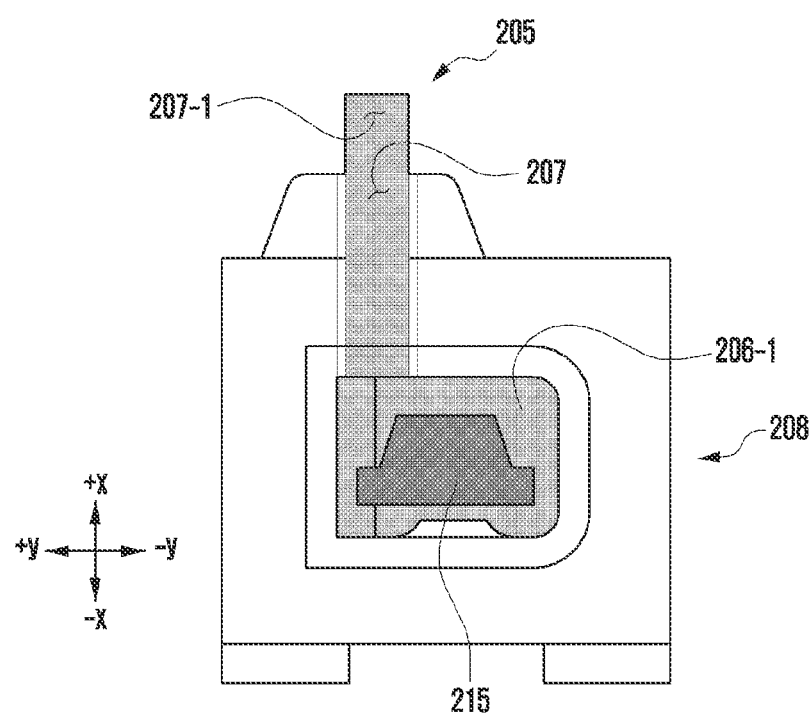
Figure 5G:
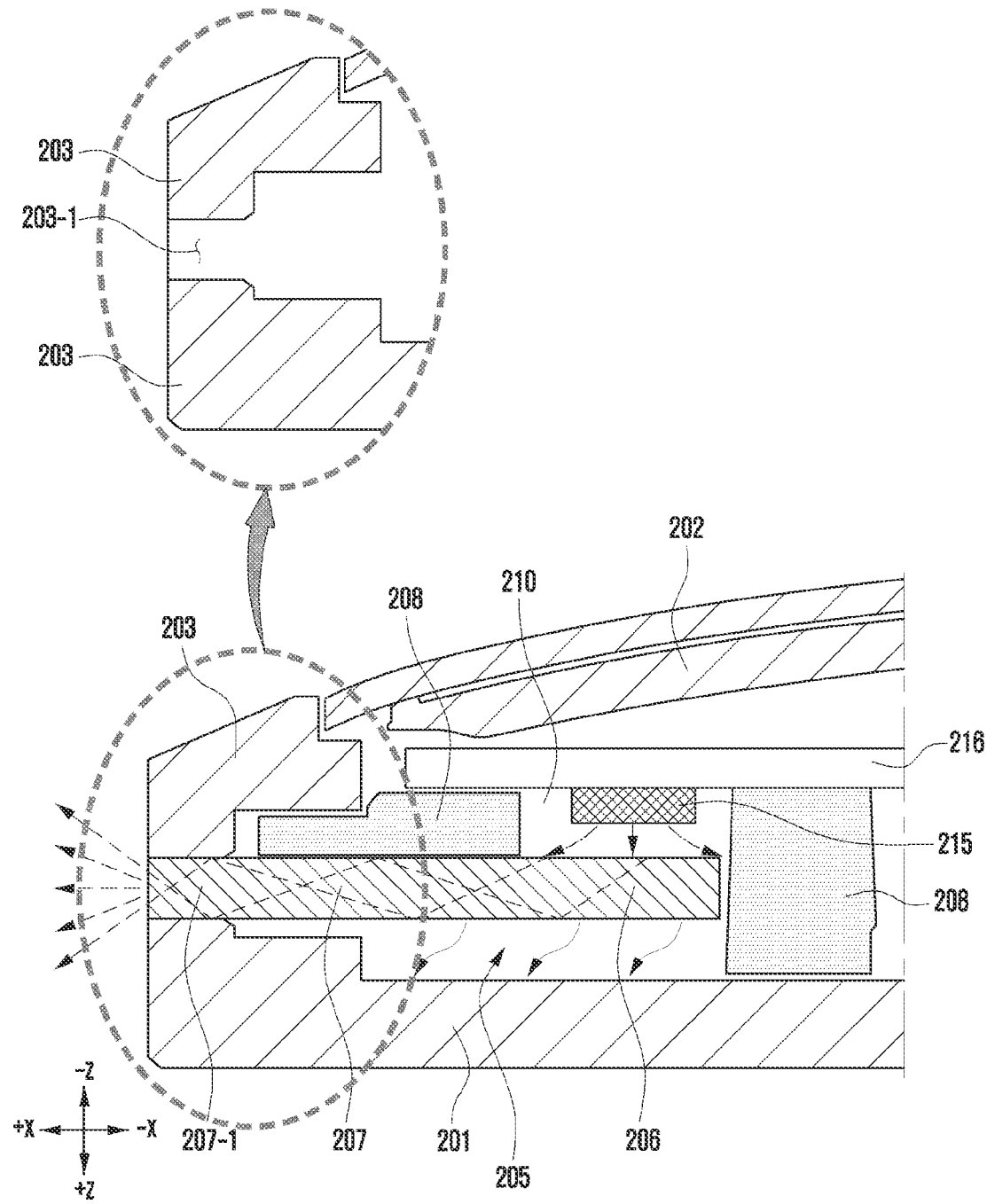
FIG. 5G is a cross-sectional view taken along line B-B in FIG. 5B in a state in which the shield member and the light guide member are assembled according to various embodiments.

FIG. 5A is a diagram illustrating a front of shield member according to various embodiments. FIG. 5B is a diagram illustrating a rear of the shield member according to various embodiments. FIGS. 5C, 5D and 5E are views illustrating an example process of inserting a light guide member into a shield member according to various embodiments. FIG. 5F is a view illustrating a state in which a shield member, a light guide member, and a light-emitting portion are assembled according to various embodiments. FIG. 5G is a partial cross-sectional view taken along line B-B in FIG. 5B in a state in which the shield member and the light guide member are assembled according to various embodiments.

In the following description, the same reference numerals are used for components that are the same as or similar to those described above with reference to FIGS. 2 to 4D, and detailed descriptions thereof may not be repeated.

According to various embodiments, as illustrated in FIGS. 5A and 5B, a shield member 208 (e.g., the shield member 208 in FIG. 4A) may be provided with a space into which a light guide member 205 (e.g., the light guide member 205 in FIG. 3) may be inserted. The periphery of the light guide member 205 may be shielded by the shield member 208. According to an embodiment, a seating portion 209 (e.g., the seating portion 209 in FIG. 4A) may be provided inside the shield member 208. A first opening 210 (e.g., the first opening 210 in FIG. 4A) connected to the seating portion 209 may be provided in the front surface of the shield member 208. A second opening 211 (e.g., the second opening 211 in FIG. 4B) connected to the seating portion 209 may be provided in the side surface surrounding the space between the front surface of the shield member 208 and the rear surface opposite to the front surface. A third opening 212 connected to the seating portion 209 may be provided in the rear surface of the shield member 208. The first opening 210, the second opening 211, and the third opening 212 may be connected to each other via the seating portion 209.

According to various embodiments, the light-emitting portion 215 of FIG. 2 may be inserted into the first opening 210 provided in the shield member 208. The first opening 210 may be closed by the printed circuit board 216 of FIG. 2 electrically connected to the light-emitting portion 215.

According to various embodiments, the guide portion 207 of the light guide member 205 may be disposed in the second opening 211 provided in the shield member 208. A light-receiving portion 206 of the light guide member 205 of FIG. 3 may be disposed in the seating portion 209 provided inside the shield member 208. According to an embodiment, a first surface 206-1 of the light-receiving portion 206 may be seated on the seating portion 209.

According to various embodiments, as illustrated in FIG. 5C, the third opening 212 may refer, for example, to an opening provided the shield member 208 in the first direction (e.g., the −Z direction illustrated in FIG. 5C). The third opening 212 may extend in a second direction (e.g., the +X direction in FIG. 5C) perpendicular to the first direction to be connected to the second opening 211 on the rear surface of the shield member 208. According to an embodiment, since the third opening 212 extends in the second direction, a portion of the second opening 211 may be exposed on the rear surface of the shield member 208.

According to various embodiments, the light guide member 205 may be inserted into and fixed to the shield member 208. The third opening 212 of the shield member 208 may be provided to correspond to the second surface 206-2 of the light-receiving portion 206. For example, the third opening 212 may be larger than or at least equal to the second surface 206-2 of the light-receiving portion 206. The size of the second opening 211 of the shield member 208 may correspond to the size of the guide portion 207 of the light guide member 205. For example, the size of the second opening 211 may be greater than or at least equal to the volume of the guide portion 207. The seating portion 209 of the shield member 208 may be provided to correspond to the light-receiving portion 206 of the light guide member 205. For example, the seating portion 209 may be larger than or at least equal to the first surface 206-1 of the light-receiving portion 206. The seating portion 209 connected to the first opening 210 may have a size corresponding to the size of the first opening 210. The first to third openings 210 to 212 and the seating portion 209 may have a size that allows the light guide member 205 to be inserted into and fixed to the shield member 208.

According to various embodiments, as illustrated in FIGS. 5C, 5D, 5E and 5F, the light guide member 205 may be inserted into the shield member 208 through the third opening 212 provided in the rear surface of the shield member 208. The light guide member 205 may be inserted into the third opening 212 in the −Z direction of FIG. 5C. Referring to FIG. 5C, in the light guide member 205, the second surface 206-2 of the light-receiving portion 206 may be inserted into the third opening 212 in the −Z direction. When the light guide member 205 is inserted into the third opening 212, the guide portion 207 of the light guide member 205 may be disposed in the second opening 211 exposed on the rear surface of the shield member 208. Referring to FIG. 5D, after the guide portion 207 is disposed in the second opening 211, the light guide member 205 may be rotated about the axis of the extension direction of the guide portion 207 (e.g., the D-D axis in FIG. 5D) so that the first surface 206-1 of the light-receiving portion 206 can be seated in the seating portion 209.

According to various embodiments, the shield member 208 may be disposed adjacent to the side member 203 of the electronic device 200 (e.g., the electronic device 101 in FIG. 1). The second opening 211 of the shield member 208 may be connected to a hole 203-1 provided in the side member 203 of the electronic device 200. As the second opening 211 is connected to the hole 203-1 provided in the side member 203, the distal end 207-1 of the guide portion 207 disposed in the second opening 211 may be exposed to the outside of the electronic device 200. For example, as illustrated in FIG. 5G, the distal end 207-1 of the guide portion 207 may be disposed in the hole 203-1 provided in the side member 203 to be exposed to the outside of the electronic device 200. In an embodiment, the distal end 207-1 of the guide portion 207 may not be directly disposed in the hole 203-1 of the side member 203. For example, the distal end 207-1 of the guide portion 207 may be disposed in the second opening 211 connected to the hole 203-1 of the side member 203 so that the light generated from the light-emitting portion 215 can be transmitted from the second opening 211 toward the hole 203-1.

According to various embodiments, the shield member 208 may be formed of various materials. For example, the shield member 208 may be formed of at least one of rubber, urethane, and silicone. The first opening 210, the second opening 211, the third opening 212, and the seating portion 209 of the shield member 208 may be manufactured in various shapes depending on the shape of the light guide member 205. Furthermore, the material and shape of the shield member 208 may be variously changed within a range that can be implemented by a person ordinarily skilled in the art.

According to various embodiments, as illustrated in FIGS. 5F and 5G, the light-emitting portion 215 may be inserted into the first opening 210 and disposed to face the light-receiving portion 206 disposed in the seating portion 209. The printed circuit board 216 electrically connected to the light-emitting portion 215 may be disposed to cover the first opening 210. The first opening 210 may be closed by the printed circuit board 216. Accordingly, the light generated from the light-emitting portion 215 may travel to the light-receiving portion 206 without escaping through the first opening 210. The third opening 212 of the shield member 208 may be closed by the front cover 201 or the rear cover 202 of the electronic device 200 illustrated in FIG. 2. Referring to FIG. 5G, the third opening 212 may be closed by the front cover 201. Accordingly, the light generated from the light-emitting portion 215 may not escape through the third opening 212. The third opening 212 may be closed by various mechanical elements disposed in the electronic device 200.

According to various embodiments, the light generated from the light-emitting portion 215 may be incident on the light-receiving portion 206 facing the light-emitting portion 215 using air as a medium. As some of the light incident from the light-emitting portion 215 on the light-receiving portion 206 is reflected from the surface of the light-receiving portion 206 and some other light passes through the interface of different media, the direction of travel may be changed due to the difference in refractive index and refraction may occur. Light refracted from the light-emitting portion 215 to the light-receiving portion 206 may be repeatedly reflected within the guide portion 207 and may move along the extension direction of the guide portion 207 (e.g., the +X direction in FIG. 5G). Finally, after moving along the extension direction of the guide portion 207, the light generated from the light-emitting portion 215 may be emitted to the outside of the electronic device 200 through the hole 203-1 of the side member 203 connected to the distal end 207-1 of the guide portion 207.

In various embodiments disclosed herein, the light guide member 205 may be inserted into the shield member 208. The first opening 210 provided in the shield member 208 may be closed by the printed circuit board 216, and the third opening 212 may be closed by the front cover 201 or the rear cover 202. As the first opening 210 and the third opening 212 are closed, the light guide member 205 may be shielded, except for the distal end 207-1 of the guide portion 207 connected to the hole 203-1 of the side member 203. Accordingly, due to the coupling of the shield member 208 and the light guide member 205, the light generated from the light-emitting portion 215 may not travel in an unnecessary direction. The light generated from the light-emitting portion 215 travels along the extension direction of the guide portion 207 and may be emitted to the outside of the electronic device 200 only through the hole 203-1 of the side member 203 connected to the distal end 207-1 of the guide portion 207.

According to various embodiments, as illustrated in FIG. 4D, a protrusion structure 214 may be provided on the shield member 208. The protrusion structure 214 (e.g., the protrusion structure 214 in FIG. 4D) may be provided around the first opening 210 and the second opening 211. For example, the protrusion structure 214 may be provided to surround the first opening 210 and the second opening 211.

According to various embodiments, a first protrusion structure 214-1 (e.g., the first protrusion structure 214-1 in FIG. 4) may be provided on the shield member 208 to surround the first opening 210. The first protrusion structure 214-1 may face the printed circuit board 216 that closes the first opening 210. For example, a portion of the first protrusion structure 214-1 facing the printed circuit board 216 may protrude toward the printed circuit board 216. The first protrusion structure 214-1 may be compressed by the printed circuit board 216. The first protrusion structure 214-1 may be electrically connected to the printed circuit board 216 to prevent and/or reduce the light generated from the light-emitting portion 215 inserted into the first opening 210 from being emitted through the space between the printed circuit board 216 and the shield member 208.

According to various embodiments, a second protrusion structure 214-2 (e.g., the second protrusion structure 214-2 in FIG. 4) may be provided on the shield member 208 to surround the second opening 211. The second protrusion structure 214-2 may face the side wall member 203 connected to the distal end 207-1 of the guide portion 207. For example, in the second protrusion structure 214-2, a portion facing the side wall member 203 may protrude toward the side wall member 203. The second protrusion structure 214-2 may be compressed by the side wall member 203. The second protrusion structure 214-2 may prevent and/or reduce a liquid, foreign material, or the like that has been introduced through the hole 203-1 provided in the side member, from entering the electronic device 200.

Figure 6A:
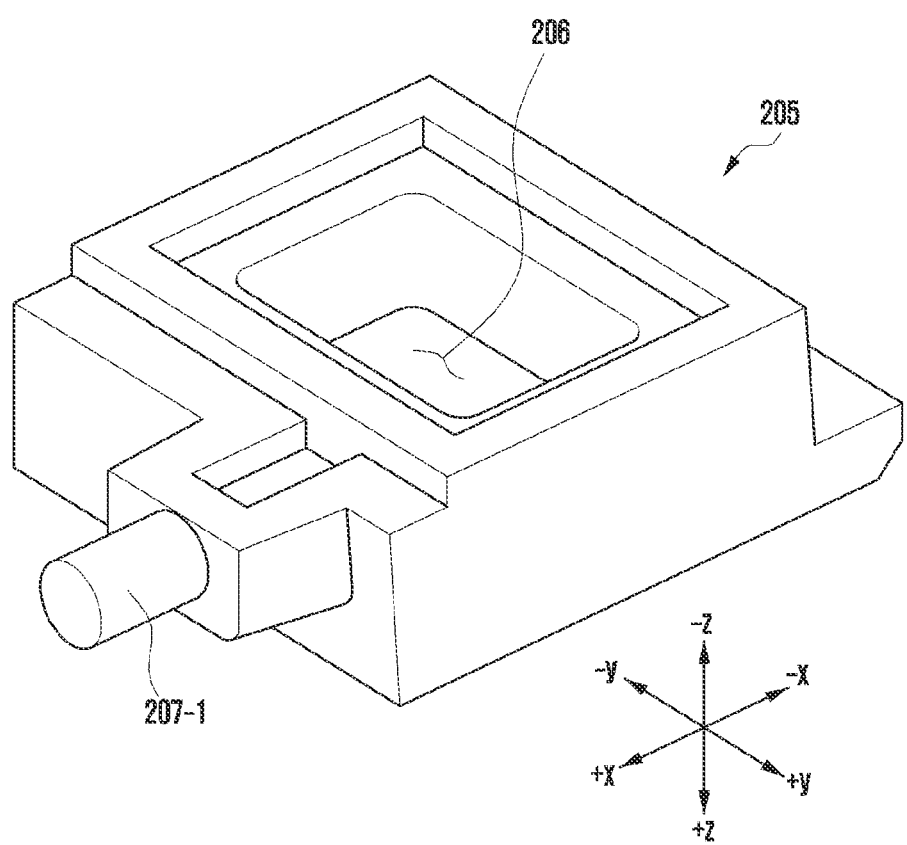
FIG. 6A is a perspective view of a light guide member according to various embodiments.
Figure 6B:
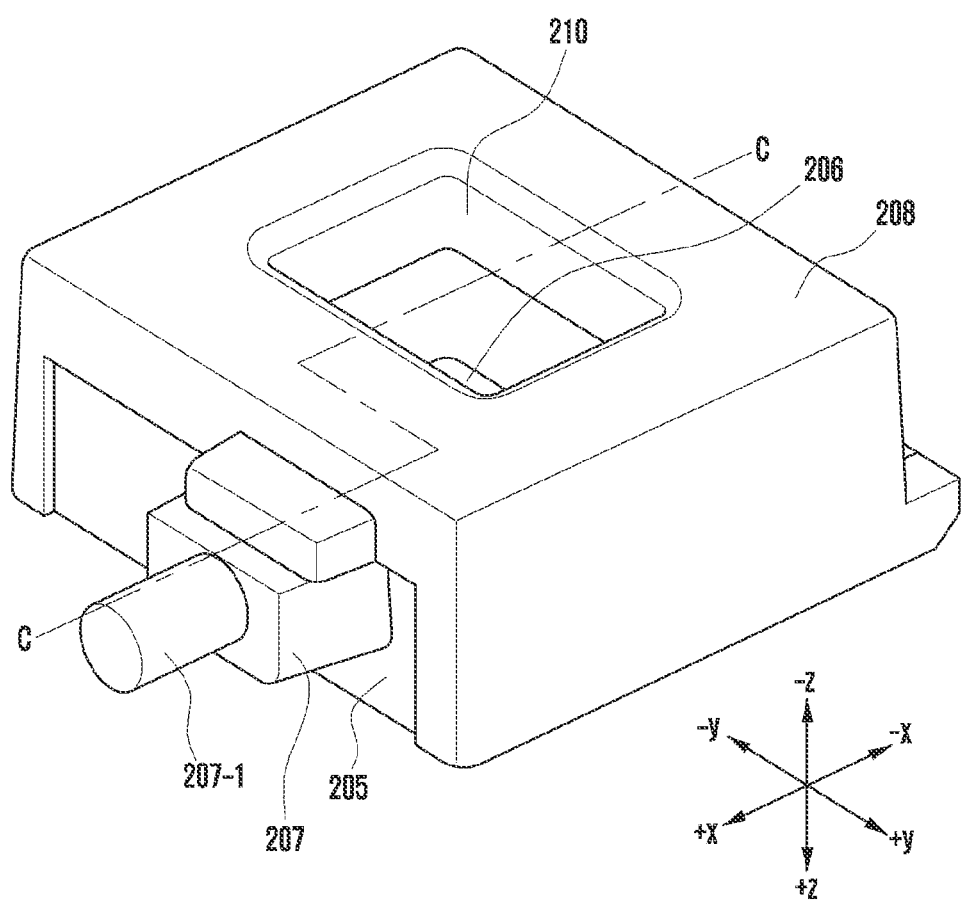
FIG. 6B is a perspective view illustrating a state in which the shield member is assembled to the light guide member according to various embodiments.
Figure 6C:
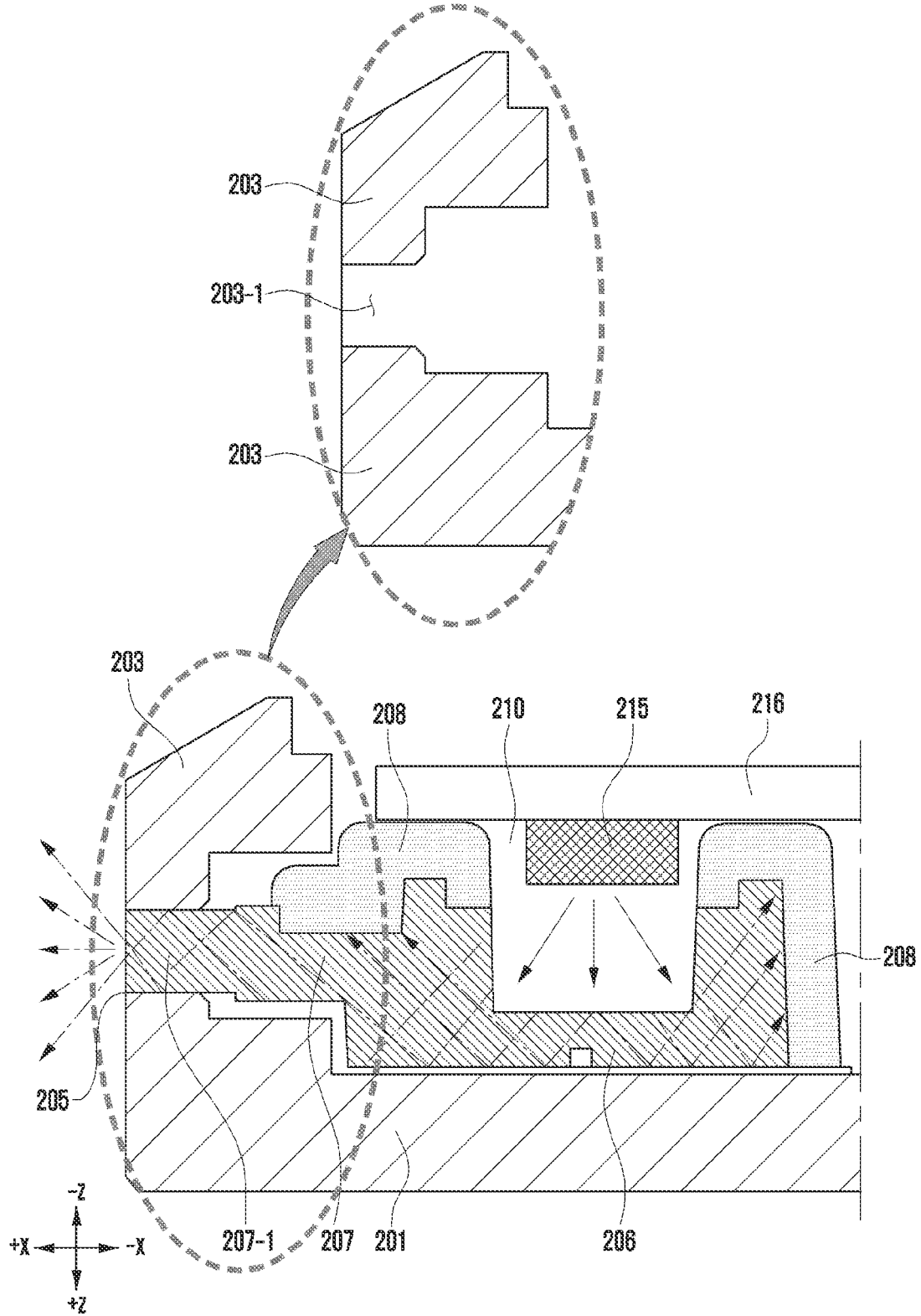
FIG. 6C is a cross-sectional view of the light guide member and the shield member, taken along line C-C in FIG. 5B according to various embodiments.

FIG. 6A is a perspective view of a light guide member according to various embodiments. FIG. 6B is a perspective view illustrating a state in which the shield member is assembled to the light guide member according to various embodiments. FIG. 6C is a cross-sectional view of the light guide member and the shield member, taken along line C-C, in FIG. 6B according to various embodiments.

In the following description, the same reference numerals are used for components that are the same as or similar to those described above with reference to FIGS. 2 to 5G, and detailed descriptions thereof may not be repeated.

According to various embodiments, a light guide member 205 (e.g., the light guide member 205 in FIG. 3) may be disposed around a light-emitting portion 215 of FIG. 2 disposed inside an electronic device 200 (e.g., the electronic device 101 in FIG. 1). The light guide member 205 may be disposed adjacent to the light-emitting portion 215. The light guide member 205 may change the traveling direction of the light generated by the light-emitting portion 215. For example, the traveling direction of light generated from the light-emitting portion 215 may be changed using a refraction or reflection phenomenon occurring in the light guide member 205.

According to various embodiments, the light guide member 205 may be manufactured in a shape illustrated in FIG. 6A. The light guide member 205 may include a light-receiving portion 206 (e.g., the light-receiving portion 206 in FIG. 3) and a guide portion 207 (e.g., the guide portion 207 in FIG. 3). The light-receiving portion 206 may refer to a portion in which the light generated by the light-emitting portion 215 is received by the light guide member 205. The guide portion 207 may refer to a portion that guides the light incident on the light-receiving portion 206 to the outside of the electronic device 200. The guide portion 207 may be formed on a side surface surrounding the space between the front surface and the rear surface opposite to the front surface.

According to various embodiments, the light guide member 205 may be formed of various materials. For example, the light guide member 205 may be formed of glass, a transparent synthetic resin, or the like. In addition, the light guide member 205 may be manufactured in various ways. For example, the light guide member 205 may be manufactured using a method such as insert injection molding, double injection molding, or the like. The light guide member 205 may be manufactured in a single body including a transparent portion and an opaque portion using a method such as insert injection molding, double injection molding, or the like.

In addition, the light-receiving portion 206 and the guide portion 207 are merely conceptually separated for describing the light guide member 205, and may not be physically separated on the light guide member 205. In the light guide member 205, the light-receiving portion 206 and the guide portion 207 may be formed as a single body using insert injection molding or double injection.

The shape and material of the light guide member 205 illustrated in FIGS. 6A, 6B and 6C described above are merely examples, and the light guide member 205 may be variously changed within a range that can be implemented by a person ordinarily skilled in the art.

According to various embodiments, the shield member 208 (e.g., the shield member 208 in FIG. 4A) may be disposed to cover the front and side surfaces of the light guide member 205. According to an embodiment, the shield member 208 may be manufactured to cover all of the front, rear, and side surfaces of the light guide member 205. The periphery of the light guide member 205 may be shielded by the shield member 208. The first opening 210 (e.g., the first opening 210 in FIG. 4A) provided in the shield member 208 may be connected to the light-receiving portion 206 provided inside the light guide member 205. The light-emitting portion 215 may be inserted into the first opening 210 provided in the shield member 208. The first opening 210 of the shield member 208 may be covered by the printed circuit board 216 of FIG. 2 electrically connected to the light-emitting portion 215. The first opening 210 may be closed by the printed circuit board 216.

According to various embodiments, the shield member 208 may be formed of various materials. For example, the shield member 208 may be formed of at least one of rubber, urethane, and silicone. In addition, the first opening 210 of the shield member 208 may be manufactured in various shapes depending on the shape of the light-receiving portion 206 of the light guide member 205. For example, the first opening 210 of the shield member 208 may be provided in the same size as the light-receiving portion 206 and connected to the light-receiving portion. Furthermore, the material and shape of the shield member 208 may be variously changed within a range that can be implemented by a person ordinarily skilled in the art.

According to various embodiments, the light guide member 205 coupled to the shield member 208 may be disposed adjacent to the side member 203 of the electronic device 200. The guide portion 207 of the light guide member 205 may be connected to a hole 203-1 provided in the side member 203 of the electronic device 200. For example, as illustrated in FIG. 6C, a distal end 207-1 of the guide portion 207 (e.g., the distal end 207-1 of the guide portion 207 in FIG. 3) may be disposed in the hole 203-1 provided in the side member 203 to be exposed to the outside of the electronic device 200. In an embodiment, the distal end 207-1 of the guide portion 207 may not be directly disposed in the hole 203-1 of the side member 203. For example, the distal end 207-1 of the guide portion 207 may be disposed in the second opening 211 connected to the hole 203-1 of the side member 203 so that the light generated from the light-emitting portion 215 can be transmitted from the second opening 211 toward the hole 203-1.

According to various embodiments, as illustrated in FIG. 6C, the light-emitting portion 215 may be inserted into the first opening 210 of the shield member 208 and disposed to face the light-receiving portion 206 of the light guide member 205. The printed circuit board 216 electrically connected to the light-emitting portion 215 may be disposed to cover the first opening 210. As the printed circuit board 216 covers the first opening 210, the first opening 210 may be closed. Accordingly, the light generated from the light-emitting portion 215 may travel to the light-receiving portion 206 without escaping through the first opening 210.

According to various embodiments, the rear surface of the light guide member 205 may be covered by the front cover 201 or the rear cover 202 of the electronic device 200 illustrated in FIG. 2. The rear surface of the light guide member 205 may be closed by the front cover 201 or the rear cover 202. For example, as illustrated in FIG. 6C, the rear surface of the light guide member 205 may be closed by the front cover 201 of the electronic device 200. Accordingly, the light generated from the light-emitting portion 215 may not escape through the rear surface of the light guide member 205.

Referring to FIG. 6C, the light generated from the light-emitting portion 215 may be incident on the light-receiving portion 206 facing the light-emitting portion 215 using air as a medium. As some of the light incident from the light-emitting portion 215 on the light-receiving portion 206 is reflected from the surface of the light-receiving portion 206 and some other light passes through the interface of different media, the direction of travel may be changed due to the difference in refractive index and refraction may occur. Light refracted from the light-emitting portion 215 to the light-receiving portion 206 may be repeatedly reflected within the guide portion 207 and may move along the extension direction of the guide portion 207 (e.g., the +X direction in FIG. 6C). Finally, after moving along the extension direction of the guide portion 207, the light generated from the light-emitting portion 215 may be emitted to the outside of the electronic device 200 through the hole 203-1 of the side member 203 connected to the distal end 207-1 of the guide portion 207.

In various embodiments disclosed herein, the light guide member 205 may be coupled to the shield member 208. The front surface of the light guide member 205 may be shielded by the shield member 208. The first opening 210 of the shield member 208 connected to the light guide member 205 may be closed by the printed circuit board 216. The rear surface of the light guide member 205 may be shielded by various mechanical elements such as the front cover 201 or the rear cover 202. The side surface of the light guide member 205 may be shielded by the shield member 208, except for a portion connected to the side member 203. A portion of the side surface of the light guide member 205 connected to the side member 203 may be shielded by the side member 203 as the light guide member 205 is disposed adjacent to the side member 205. Accordingly, as the periphery of the light guide member 205 is shielded, the light generated from the light-emitting portion 215 may not travel in an unnecessary direction. In addition, since various mechanical elements, other than the shield member 208, the printed circuit board 216, the front cover 201, the rear cover 202, or the like are used to shield the periphery of the light guide member 205, the disclosure may present a more efficient light blocking structure compared to the prior art.

According to various embodiments, a protrusion structure 214 (e.g., the protrusion structure 214 in FIG. 4D) may be provided on the shield member 208. The protrusion structure 214 may be provided on the shield member 208. For example, the protrusion structure 214 may be provided to surround the first opening 210 of the shield member 208, and may be provided on the side surface of the shield member 208 facing the side member 203.

According to various embodiments, a first protrusion structure 214-1 (e.g., the first protrusion structure 214-1 in FIG. 4) may be provided on the shield member 208 to surround the first opening 210. The first protrusion structure 214-1 may face the printed circuit board 216 that closes the first opening 210. For example, a portion of the first protrusion structure 214-1 facing the printed circuit board 216 may protrude toward the printed circuit board 216. The first protrusion structure 214-1 may be compressed by the printed circuit board 216. The first protrusion structure 214-1 may be electrically connected to the printed circuit board 216 to prevent and/or reduce the light generated from the light-emitting portion 215 inserted into the first opening 210 from being emitted through the space between the printed circuit board 216 and the shield member 208.

According to various embodiments, a second protrusion structure 214-2 (e.g., the second protrusion structure 214-2 in FIG. 4D) may be provided on the side surface of the shield member 208 facing the side member 203. The second protrusion structure 214-2 may face the side wall member 203 connected to the distal end 207-1 of the guide portion 207. For example, in the second protrusion structure 214-2, a portion facing the side wall member 203 may protrude toward the side wall member 203. The second protrusion structure 214-2 may be compressed by the side wall member 203. The second protrusion structure 214-2 may prevent and/or reduce a liquid, foreign material, or the like that has been introduced through the hole 203-1 provided in the side member, from entering the electronic device 200.

An electronic device (e.g., the electronic device 101 of FIG. 1) according to various example embodiments may include: a light shield including a seating portion provided therein, a first opening provided in a front surface of the light shield connected to the seating portion, and a second opening provided in a side surface of the light shield connected to the seating portion, wherein the electronic device may further include a light guide including a light-receiving portion and a guide portion extending in one direction from the light-receiving portion, wherein the guide portion is disposed in the second opening and the light-receiving portion is seated on the seating portion, and may include a light-emitting portion comprising light emitting circuitry inserted into the first opening of the shield member and face the light-receiving portion.

The light guide may be inserted into the light shield through the first opening.

The light shield may include an inclined surface provided on one surface thereof configured to guide the light guide inserted through the first opening.

The light shield may include a third opening provided in a rear surface thereof opposite to the front surface in a first direction (e.g., the −Z direction illustrated in FIG. 5C) connected to the seating portion.

At least a portion of the third opening may extend in a second direction (e.g., the +X direction illustrated in FIG. 5C) perpendicular to the first direction connected to the second opening.

The light guide may be configured to be inserted into the third opening in the first direction and rotated about an axis of the extension direction of the guide portion (e.g., the D-D axis illustrated in FIG. 5D) so that the light-receiving portion is seated in the seating portion, and the guide portion is disposed in the second opening.

The seating portion may be configured to correspond to the light-receiving portion to fix the light-receiving portion, and the second opening may be configured to correspond to the guide portion to fix the guide portion.

The electronic device may further include a housing (e.g., the front cover 201 in FIG. 2, the rear cover 202 in FIG. 2, or the side member 203 in FIG. 2), and the light shield may be configured to be installed in the housing to close the third opening.

The light-emitting portion may include a printed circuit board and a light-emitting diode electrically connected to the printed circuit board, wherein the light-emitting diode may be inserted into the first opening to face the seating portion, and the printed circuit board may cover the first opening.

The light shield may include a protrusion provided to surround at least one of the first opening and the second opening.

One end of the guide portion may be exposed to the outside of the electronic device.

An electronic device (e.g., the electronic device 101 of FIG. 1) according to various example embodiments may include: a housing (e.g., the front cover 201 in FIG. 2, the rear cover 202 in FIG. 2, or the side member 203 in FIG. 2), a hole provided in the housing in a first direction (e.g., the +X direction illustrated in FIG. 4D), a light guide, a light shield including a seating portion provided in the light shield such that the light guide is seated therein, a first opening provided in a front surface of the light shield connected to the seating portion, a second opening provided in a side surface of the light shield connected to the seating portion, and a third opening provided in a rear surface of the light shield opposite to the front surface in a second direction (e.g., the −Z direction illustrated in FIG. 5C) perpendicular to the first direction and connected to the seating portion, wherein the third opening is configured to be closed by the housing, and a light-emitting portion comprising light emitting circuitry inserted into the first opening of the light shield to face the light guide and to close the first opening, wherein, in the light shield, the second opening may be connected to the hole such that light generated from the light-emitting portion can be emitted to the outside of the electronic device.

The light guide may include a light-receiving portion and a guide portion extending in one direction from the light-receiving portion, wherein the guide portion may be disposed in the second opening, and the light-receiving portion may be seated on the seating portion.

The light guide may be inserted into the light shield member the first opening, and the light shield may include an inclined surface provided on one surface of the light shield configured to guide the light guide inserted through the first opening.

At least a portion of the third opening may extend in a third direction (e.g., the +X direction illustrated in FIG. 5C) perpendicular to the second direction connected to the second opening.

The light guide may be inserted into the third opening in the second direction and rotated about an axis of the extension direction of the guide portion (e.g., the D-D axis illustrated in FIG. 5D) so that the light-receiving portion can be seated in the seating portion, and the guide portion can be disposed in the second opening.

The seating portion may be configured to correspond to the light-receiving portion to fix the light-receiving portion, and the second opening may be configured to correspond to the guide portion to fix the guide portion.

The light-emitting portion may include a printed circuit board and a light-emitting diode electrically connected to the printed circuit board, wherein the light-emitting diode may be inserted into the first opening to face the seating portion, and the printed circuit board may cover the first opening.

The light shield may include a protrusion provided to surround at least one of the first opening and the second opening.

One end of the guide portion may be disposed in the hole provided in the housing.

While the disclosure has been illustrated and described with reference to various example embodiments, it will be understood that the various embodiments are intended to be illustrative, not limiting. It will be further understood by those skilled in the art that, in addition to the various example disclosed herein, various changes or modifications to the various embodiments are included in the scope of the disclosure. It will also be understood that any of the embodiment(s) described herein may be used in conjunction with any other embodiment(s) described herein.

What is claimed is:

1. An electronic device comprising:
   a light shield including a seating portion provided therein, a first opening provided in a front surface of the light shield and connected to the seating portion, and a second opening provided in a side surface of the light shield and connected to the seating portion;
   a light guide including a light-receiving portion and a guide portion extending in one direction from the light-receiving portion, wherein the guide portion is disposed in the second opening and the light-receiving portion is seated on the seating portion; and
   a light-emitting portion comprising light-emitting circuitry inserted into the first opening of the shield member facing the light-receiving portion.

2. The electronic device of claim 1, wherein the light guide is configured to be inserted into the shield member through the first opening.

3. The electronic device of claim 1, wherein the light shield includes an inclined surface provided on one surface of the light shield and configured to guide the light guide to be inserted through the first opening.

4. The electronic device of claim 1, wherein the light shield includes a third opening provided in a rear surface of the light shield opposite to the front surface in a first direction and is connected to the seating portion.

5. The electronic device of claim 4, wherein at least a portion of the third opening extends in a second direction perpendicular to the first direction and is connected to the second opening.

6. The electronic device of claim 5, wherein the light guide is configured to be inserted into the third opening in the first direction and rotated about an axis of an extension direction of the guide portion so that the light-receiving portion is seated in the seating portion, and the guide portion is disposed in the second opening.

7. The electronic device of claim 1, wherein the seating portion corresponds to the light-receiving portion to fix the light-receiving portion, and
   the second opening corresponds to the guide portion to fix the guide portion.

8. The electronic device of claim 4, further comprising: a housing,
   wherein the light shield is disposed in the housing to close the third opening.

9. The electronic device of claim 1, wherein the light-emitting portion includes a printed circuit board and a light-emitting diode electrically connected to the printed circuit board,
   the light-emitting diode is disposed in the first opening to face the seating portion, and
   the printed circuit board covers the first opening.

10. The electronic device of claim 1, wherein the light shield includes a protrusion surrounding at least one of the first opening and the second opening.

11. The electronic device of claim 1, wherein one end of the guide portion is exposed to an outside of the electronic device.

12. An electronic device comprising:
    a housing;
    a hole provided in the housing in a first direction;
    a light guide;
    a light shield including a seating portion provided therein such that the light guide member is seated therein, a first opening provided in a front surface of the light shield and connected to the seating portion, a second opening provided in a rear surface of the light shield and connected to the seating portion, and a third opening provided in a rear surface of the light shield opposite to the front surface in a second direction perpendicular to the first direction and connected to the seating portion, wherein the third opening is closed by the housing; and
    a light-emitting portion comprising light-emitting circuitry disposed in the first opening of the light shield to face the light guide and to close the first opening, wherein, in the light shield, the second opening is connected to the hole such that light generated from the light-emitting portion is emitted to the outside of the electronic device.

13. The electronic device of claim 12, wherein the light guide includes a light-receiving portion and a guide portion extending in one direction from the light-receiving portion, wherein the guide portion is disposed in the second opening and the light-receiving portion is seated on the seating portion.

14. The electronic device of claim 12, wherein the light guide is configured to be inserted into the light shield through the first opening, and
the light shield includes an inclined surface provided on one surface of the light shield configured to guide the light guide inserted through the first opening.

15. The electronic device of claim 12, wherein at least a portion of the third opening extends in a third direction perpendicular to the second direction and connected to the second opening.

16. The electronic device of claim 13, wherein the light guide is configured to be inserted into the third opening in the second direction and rotated about an axis of an extension direction of the guide portion so that the light-receiving portion is seated in the seating portion, and the guide portion is disposed in the second opening.

17. The electronic device of claim 13, wherein the seating portion corresponds to the light-receiving portion to fix the light-receiving portion, and the second opening corresponds to the guide portion to fix the guide portion.

18. The electronic device of claim 12, wherein the light-emitting portion includes a printed circuit board and a light-emitting diode electrically connected to the printed circuit board,
the light-emitting diode is disposed in the first opening to face the seating portion, and
the printed circuit board covers the first opening.

19. The electronic device of claim 12, wherein the light shield includes a protrusion surrounding at least one of the first opening and the second opening.

20. The electronic device of claim 13, wherein one end of the guide portion is disposed in the hole provided in the housing.

* * * * *